United States Patent [19]

Grihangne

[11] 4,370,229

[45] Jan. 25, 1983

[54] HIGH CAPACITY OIL RECUPERATOR FOR DE-POLLUTION IN ROUGH WATERS

[76] Inventor: André E. Grihangne, 186, Avenue Victor Hugo, Paris, France, 75116

[21] Appl. No.: 258,393

[22] Filed: Apr. 28, 1981

[30] Foreign Application Priority Data

May 8, 1980 [FR] France ............................ 80 10234

[51] Int. Cl.³ .......................................... E02B 15/04
[52] U.S. Cl. .............................. 210/242.3; 210/512.1; 210/923; 440/43
[58] Field of Search ..................... 210/787, 788, 512.1, 210/242.3, 242.2, 242.4, 241, 242.1, 923; 60/325, 398

[56] References Cited

U.S. PATENT DOCUMENTS 3,576,257 4/1971 Yates ................................. 210/242.3
4,038,182 7/1977 Jenkins ................................ 210/788
4,142,972 3/1979 Nebeker et al. ..................... 210/787

OTHER PUBLICATIONS

Chung J. S. et al., "Oil Recovery Performance of the Lockheed Disc-Drum Device-A Parametric Study", Oceans 1976, pp. 12B1-12B10.

Primary Examiner—Benoit Castel
Attorney, Agent, or Firm—Fitzpatrick, Cella, Harper & Scinto

[57] ABSTRACT

The invention relates to a high capacity oil recuperator for use in rough waters, associated with a fixed platform or to a de-polluting ship.

Said recuperator consists of a submerged assembly composed of a cylinder of vanes rotating inside a stator of which the configuration induces and maintains in the liquid mixture sucked in a localized vortex which is not associated with the flow and in which the oil concentrates immediately under the effect of a strong centrifugal acceleration. A pump working in connection with the stator sucks in the oil for storage purposes. The energy communicated to the rejected cleaned water can be advantageously used for propelling and maneuvering the ship or platform.

The invention finds an application in the production of skimming crafts of all capacity used for the de-pollution of rough waters, in harbors, rivers, estuaries, and at sea.

2 Claims, 8 Drawing Figures

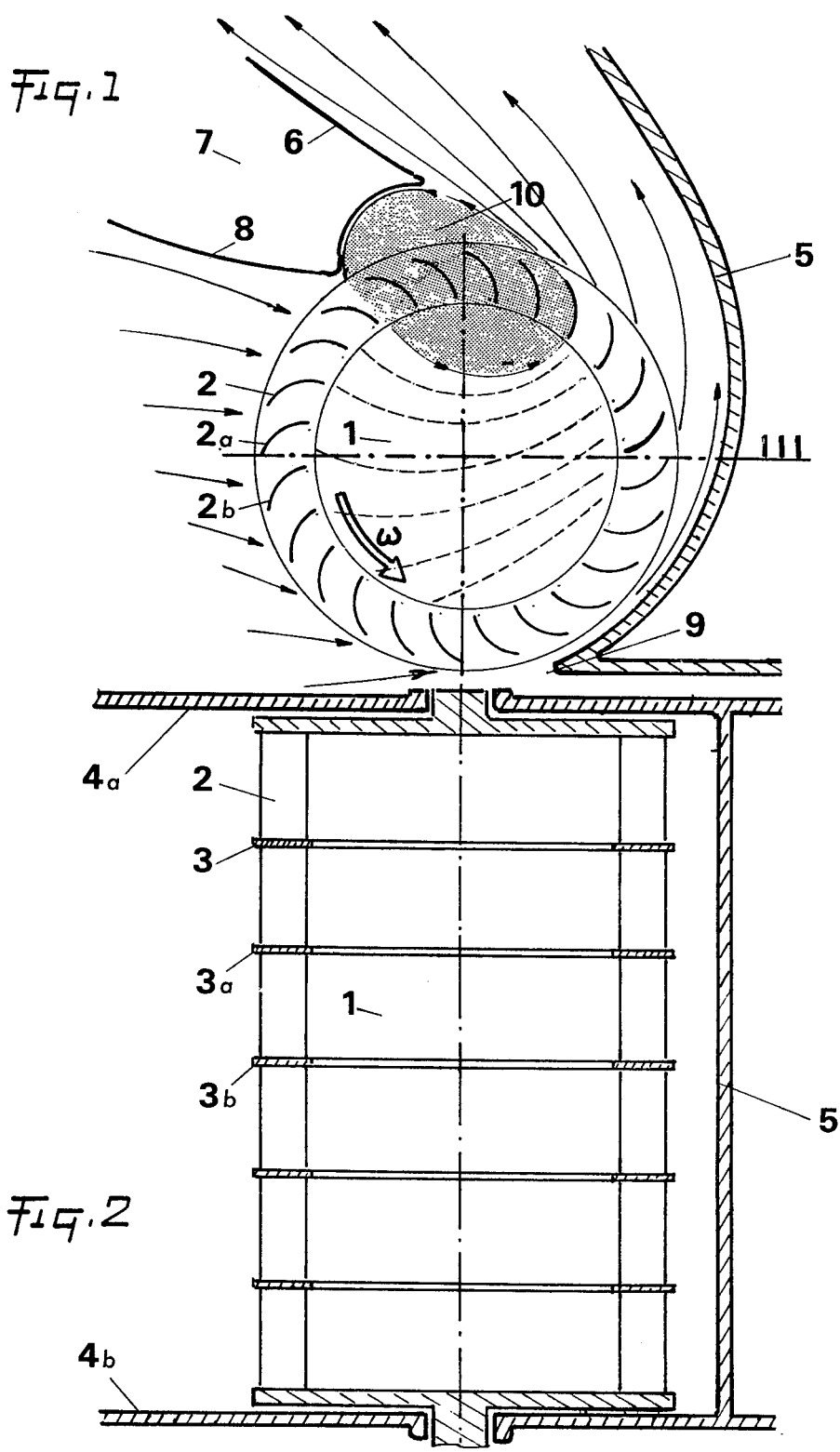

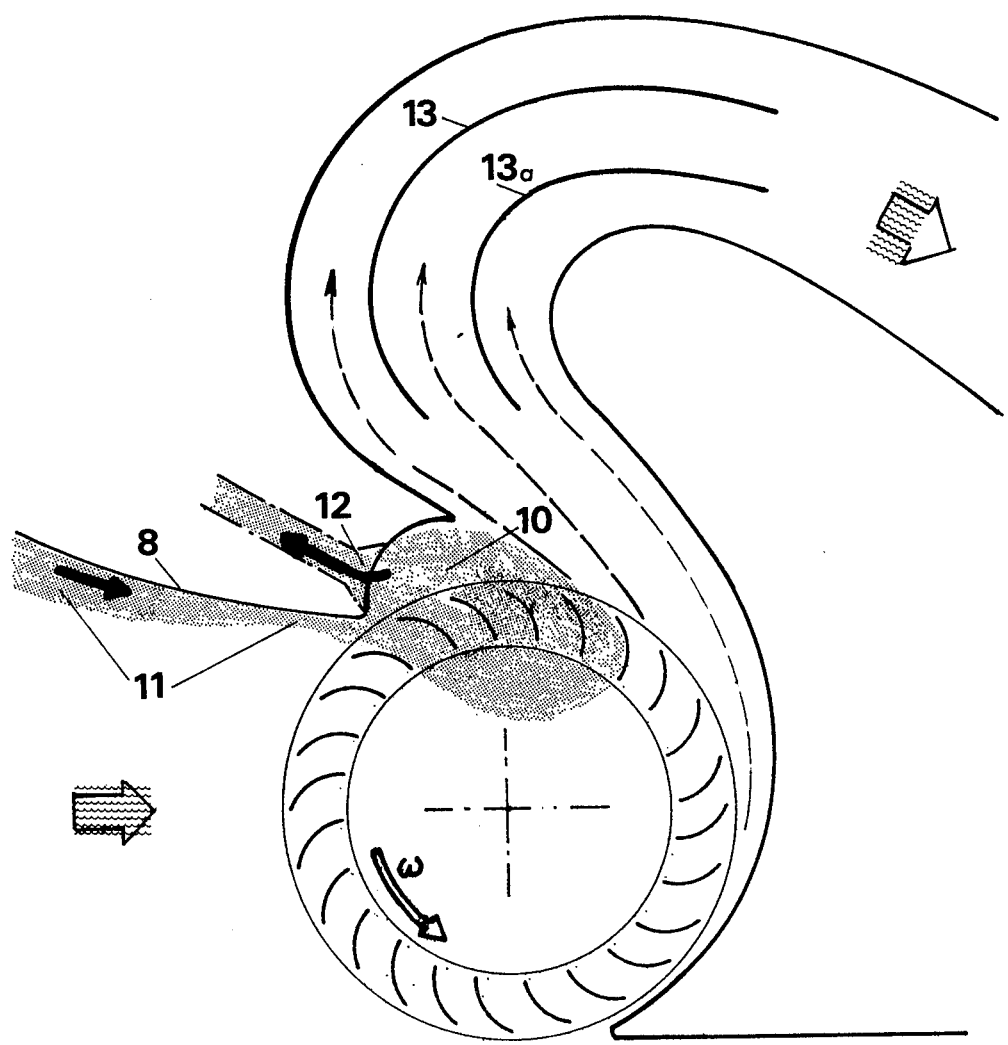

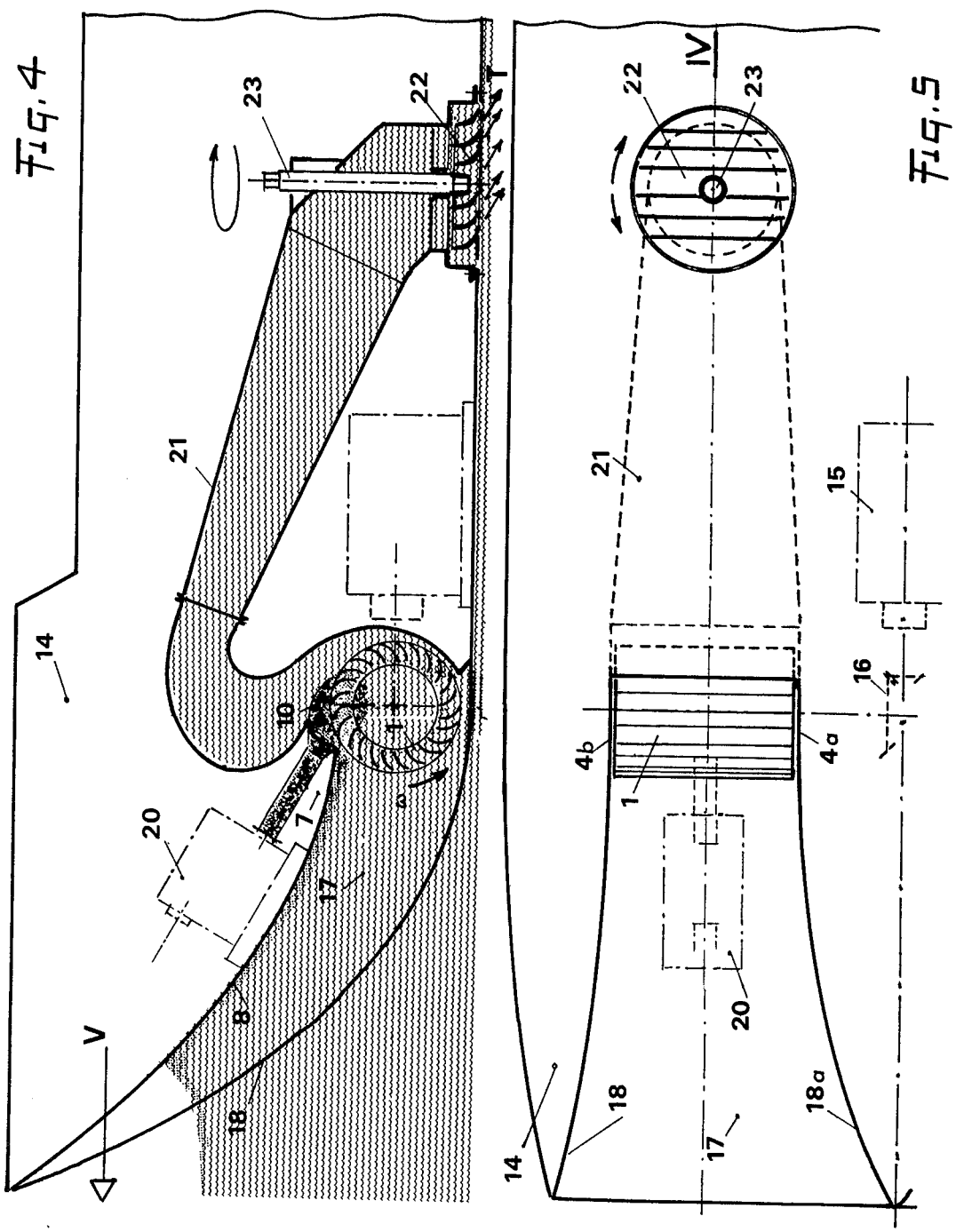

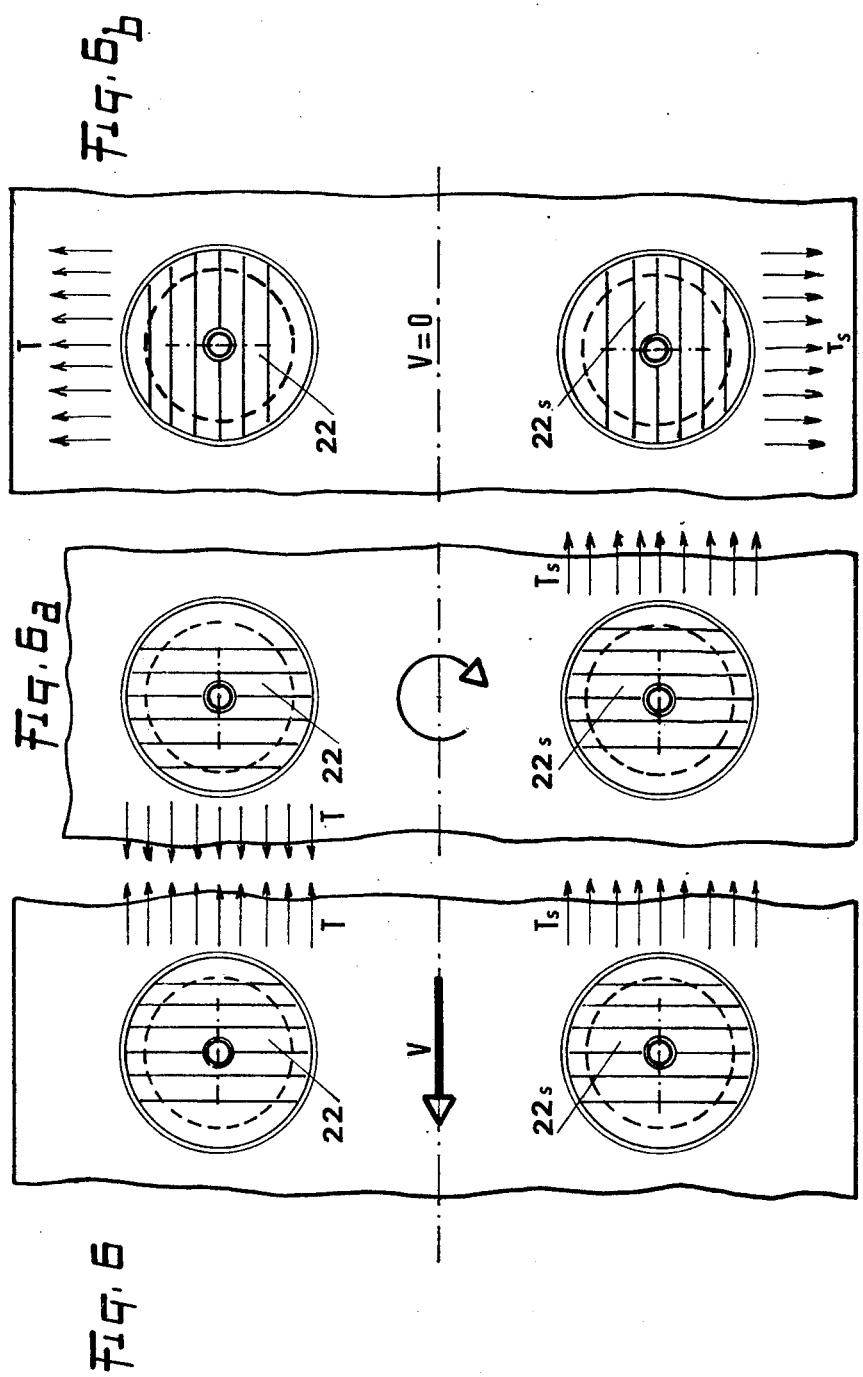

HIGH CAPACITY OIL RECUPERATOR FOR DE-POLLUTION IN ROUGH WATERS

The present invention relates to a high capacity recuperator with induced vortex, for the de-pollution of rough waters, associated with a platform floating on a river or on the sea.

For example, the floating platform may be a de-polluting ship to which is incorporated the recuperator with induced vortex, the disposition of which can simultaneously permit the separation of hydrocarbons from the water, the recovery of the polluting substance and the propelling and maneuvering of the ship over the area of recovery.

The floating installation may also be a static structure fitted on the base of an angled barrier so as to cut off the river or marine stream of polluting slick, or a structure placed at the point of the V formed by a towed marine barrier.

A whole series of methods have been proposed and for some of them even applied, for the purpose of "skimming" the surface of the water and of mechanically recovering the hydrocarbons accidentally discharged therein.

These mechanical recuperators of various types—with weirs, or discs, or strips, or barriers and integrated recuperators, with static or dynamical vortex—are usable in calm waters, but their efficiency as water/pollutant separators and their capacity of recovery considerably diminish with the state of the sea. From the more recent oil slick occurrences, it has been found that none of the known installations was really satisfactory in the case of catastrophic discharges of hydrocarbons in rivers, harbours or in the sea.

At sea, the use of barriers, which the currently used installations involve, is risky since it is impossible to bring them in, in bad weather; the forces to which they will be subjected, even if the riggings have been detached and they are just kept on tow could damage them. On the other hand if the device is disconnected every time bad weather is expected, the effective duration of the recuperation will often be negligible.

The endeavor has been to use dynamic recuperators, designed to be used without barriers and to be carried by sea-going ships with large storage capacities. But the ship/recuperator combination remains fragile where the fastening means on the hull are concerned; in addition, the pitching and rolling effects, added to the swell, can considerably reduce the efficiency of the recuperators. In practice, any intervention of the currently known installation in waves reaching above 2 meters is inefficient if not dangerous.

In the circumstances, it has been proposed to study the possibility of de-polluting ships of heavy or very heavy tonnage with integrated recuperator and treatment system. This tendency is based in fact on the analysis which is currently conducted of the physical phenomena usable to conduct efficiently, in rough seas, the water-oil separation. So far, the de-polluting ships of heavy tonnage which are being studied to carry out these known methods would require extremely high development and operational expenditures, for no profits are made when they are not de-polluting.

We have therefore reached a technological dead-end, and we will only get around it with the currently proposed means with time and investments, which an interministerial commission of a country such as ours, who has however suffered two major oil catastrophies recently, has judged "prohibitory at the national level".

Generally speaking, the present invention seeks to bring original technical solutions to these main problems, backed up by experimental research works that the Applicant has conducted with the help of the "Institut de Mécanique des Fluides" of Lille (I.M.F.L.).

These solutions have been retained as the most satisfactory to break through the "technological dead-end" which the Experts have now reached, from the standpoint of efficiency and economy of means—both at the building stage and at the utilization stage—or from the standpoint of performances, of safety and possible combining of uses of the carrier-ship. It should be well understood that although the invention preferably protects the combination and the integration of the different means proposed, it is not limited to that combination, but on the contrary extends to the new and specific means that it recommends and the combination of which constitutes a working plant.

The main object of the invention is to produce a new high capacity marine recuperator of polluting hydrocarbons:

permitting the rapid skimming of a river or marine area, even in rough waters, capable of being fitted in a fixed or mobile de-pollution installation, regardless of the dimensions of the latter, adapted to be functionally incorporated to the quick works of a ship and to furnish as secondary product the force necessary to propel said ship and to manoeuver it over the areas to be de-polluted, permitting to design de-polluting ships with a large capacity range, capable of various functions (fighting fires, life-saving, etc. . . . ) depending on the needs: de-pollution of harbour areas, of estuaries, and de-pollution at sea.

The invention relates more particularly, although non-exclusively, to a recuperator constituted by a new turbomachine, of preferably horizontal axis, of which the liquid stream going through a rotor perpendicular to its axis of rotation is guided by an entirely submerged stator situated in the floating structure which supports it, and which may be a stationary platform or a ship.

According to a first characteristic of the invention, the stator comprises a cylindrical wall whose directrix has a turning point defining the profile of a crook which leaves a small air-gap between its end and the vanes of the rotor. Said crook separates the incoming stream from the outgoing stream.

According to another characteristic of the invention, the rotor is constituted by a cylindrical barrel of vanes, the concavity of which faces the direction of rotation. The flowing of the stream is characterized by the formation of a swirling core or induced vortex non-associated to the flow whose intensity is dependent on the peripheral speed of the vanes and which is situated in the vicinity of the crook on either side of the vane grid. On the periphery of the vortex, the lines of streams issuing from the rotor form with those re-entering said rotor a liquid diffuser which varies with the rate of flow and along which the pressure changes without any loss by friction as would happen close to a rigid wall diffuser. Experiments conducted with such a turbomachine have shown that the average speeds associated to the lines of outgoing flow are much higher than the peripheral speed of the vanes, this explaining the very high rates of flow for a predetermined outlet section.

According to another characteristic of the invention, advantageously related to the preceding ones, the regulation of the outgoing flow modifies somewhat the position of the vortex and increases its dimensions.

According to another characteristic of the invention also related to the preceding ones, the induced vortex created by the hydrodynamical interaction between the rotor and the stator is the basis for a strong centrifugal acceleration which can reach a magnitude ten times that of gravity (k×10 g). When the incoming stream of liquid is composed of water and oil, oil being less dense than water is immediately concentrated in the vortex, the said centrifugal acceleration ensuring in situ the separation of the oil from the water.

According to another characteristic of the invention, the downstream wall—in relation to the direction of rotation of the rotor—is convex and thus ensures the guiding submerged of the oil slick sucked in by the rotor as far as close to the air gap between the crook and the rotor, where it is caught into the vortex. The upper part of the stream sucked in by the rotor and which contains the largest part of the polluting substance is laterally confined by two sides converging towards the rotor so as to enclose the maximum flow and to cause the thickness of the oil slick to increase by narrowing the inlet offered thereto.

According to another characteristic of the invention, the oil is sucked in as and when it enters the vortex through a parietal inlet provided in the concave nose-piece of the crook, thus ensuring the separation between the polluted incoming stream and the outgoing stream of cleaned water.

Owing to the possibility of varying independently the speed of the rotor—and as a result the intensity of the centrifugal acceleration inside the vortex—on the one hand, and on the other hand, the regulation of the outgoing flow, and as a result the position and dimensions of the vortex—with known means, this particular design of the recuperator according to the invention offers a simple and advantageous solution to a problem as yet unsolved, and which is that of the optimum adaptation of the recuperator to the physical characteristics of the polluting material, to the thickness of the slick and to the forward speed on the surface of the water in the case of a de-polluting ship.

Finally, according to a last characteristic of the invention, the energy communicated to the stream sucked up by the recuperator can be utilized to propel and maneuver the ship thus equipped, during the de-polluting operations.

The invention will be more readily understood on reading the following description with reference to the accompanying drawings, in which:

FIG. 1 illustrates how the liquid sucked up by the recuperator is meant to flow;

FIG. 2 is a cross-sectional view along line III of the rotor/stator assembly of FIG. 1;

FIG. 3 shows the recovery of the oil from the polluted stream sucked up by the recuperator according to the invention;

FIG. 4 is an elevational cross-section along line IV of FIG. 5 and shows an example of embodiment of the integration of an oil recuperator to a de-polluting ship, of which ship it also ensures the propelling;

FIG. 5 is a half-view from beneath of FIG. 4, the other half, not shown, being symmetrical;

FIGS. 6, 6a, 6b are views from beneath of propelling outlet nozzles of the oil recuperator according to the invention used as principal or auxiliary propelling means.

FIGS. 1 and 2 diagrammatically illustrate the flow whose characteristics are exploited by the invention, and wherein a rotor 1 provided with vanes 2, 2a, 2b . . . whose concavity faces the direction of rotation W and which are held in position in cylindrical shape, by rings 3, 3a, 3b . . . is supported by the bearing plates 4a, 4b of a stator whose delivery volute 5 and the upstream wall 6 of the crook 7 channel the outgoing stream. The incoming stream is delimited at its upper part by the downstream wall 8 of the crook and at its lower part by the upstream edge 9 of the volute. An induced vortex 10 is created on either side of the vane-grid of the rotor, at the contact of the concave nose-piece of the crook 7. Said vortex is not associated to the flow and its direction of rotation indicated by the arrows placed on the boundary line of flow is the same as that of the rotor.

FIG. 3 shows the process of concentrating and recovering the oil contained in the upper part of the sucked-in stream. The downstream wall 8 of the crook is designed so as to carry the oil and water slick 11 close to the air gap formed by the crook and the rotor. The oil which is less dense concentrates in the vortex 10 under the effect of the field of centrifugal forces and is sucked in gradually through the parietal intake 12 and then delivered by known means to the storage provided to this effect.

The shape of the cleaned water delivery conduit causes the outgoing stream to turn towards the back where it will be ejected with a large quantity of movement in order to propel the hull which supports the recuperator according to the invention. A grid of vanes 13, 13a, ensures the curving in of the stream while reducing the loss of load imposed as a result.

FIGS. 4 and 5 illustrate an example of how to integrate a recuperator according to the invention to a de-polluting ship 14 which it also propels and in which two rotors 1 and 1s (s meaning symmetrical, not shown) are driven simultaneously at the variable speed W by at least one engine 15 and a power transmission 16. Two channels 17 and 17s are provided at the bows of the ship, each one being bordered laterally by the converging sides 18, 18a which join up with side-plates of each one of the stators. The upper part of these channels is constituted by the walls 8 and 8a which materialize the downstream walls of the crooks 7 and 7s. The separation of the oil from the water is effected as indicated hereinabove. The oil is sucked up by the pumps 20 and 20s as it enters the vortices 10 and 10s. The cleaned water is delivered into distributing conduits 21 and 21s, and is ejected through the directional grids of vanes 22 and 22s which are controlled in all directions by shafts 23 and 23s controlled from the steering by known means.

FIGS. 6, 6a, 6b show three combinations of the pressures T and Ts of each one of the two jets which offer a clear advantage in ensuring the maneuverability of the ship 14, especially during the de-pollution operations.

In FIG. 6, the two pressures T and Ts are parallel and, of the same direction and they propel the ship at the speed V.

In FIG. 6a, the two pressures T and Ts create a torque allowing the ship to swing.

In FIG. 6b, the two pressures T and Ts give a nil resultant and allow the operation of the recuperator whilst keeping the ship at no speed.

The installation described hereinabove is only one example of an embodiment of the invention. The marine recuperator of oil according to the invention may be installed in different ways, depending on whether its utilization is limited to the recovery of polluting oil from a fixed installation, or whether the energy used to drive its rotating part can also be used to propel and maneuver the ship designed to carry away an oil slick.

The high capacity marine recuperator of oil, with induced vortex finds a special application in the production of sea-going crafts of increasing tonnage, depending on whether they are used in harbour areas, in estuaries or at sea.

What is claimed is:

1. A high capacity oil slick recuperator for use in rough waters, comprising:

a stator having an inlet, a rotor rotatable inside said stator and provided with vanes, which rotor sucks in polluted water perpendicularly to its axis of rotation, wherein the stator-rotor assembly is adapted to be entirely submerged and wherein the configuration of the stator generates and maintains, by interaction between stator and rotor, a stream which induces a vortex stabilized in all azimuths on the periphery of the rotor and which is not associated with the general flow of the water stream, the axis of said vortex being parallel to the axis of the rotor and its intensity being dependent on the speed of rotation of the rotor; and wherein the oil slick on the water surface is carried as far as the vortex by the water stream being guided in submersion along a wall extending forward from the stator inlet and intercepting the water surface, and wherein the oil, which is less dense than the water, is caught into said vortex wherefrom it is sucked up as it enters it, via pumping means, towards a storage, the axis of the rotor being substantially horizontal, the said rotor being constituted by a grid of identical vanes arranged in cylindrical form at its periphery and in parallel to its axis of rotation, the upper inside wall profile of the stator being provided close to the periphery of the rotor with a cuspidal edge parallel to the vanes of the rotor and creating with the latter a small gap, the said cuspidal edge ensuring the separation between the incoming and outgoing water streams; the profile of said wall downstream of the said edge being substantially akin to the flow boundary line of said induced vortex, the said profile forming a crook which localizes said vortex; the oil pumping means being located in the vortex and constituted by a parietal intake provided in a concave nose-piece of the crook of the stator and which communicates with an induction pipe of a pump which transfers recuperated oil to the storage.

2. Oil slick recuperator as claimed in claim 1, wherein the stator is incorporated at the front of the hull of a floating platform or of a ship, the extending part forward of the upper wall of said stator constituting the fore part of the hull and intercepting the surface of the water, and wherein the water is repelled from the stator-rotor assembly rearwardly of the platform or of the ship in order to propel same.

* * * * *